May 4, 1965  R. P. KUMFERMAN  3,181,717
OPENABLE REAR BEAM
Filed Oct. 16, 1961  4 Sheets-Sheet 4
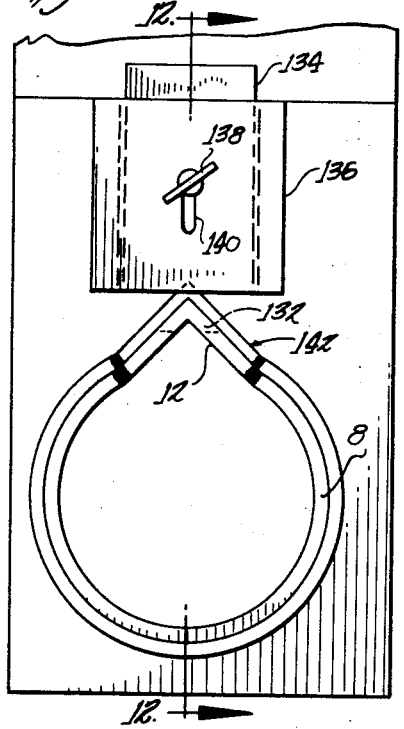
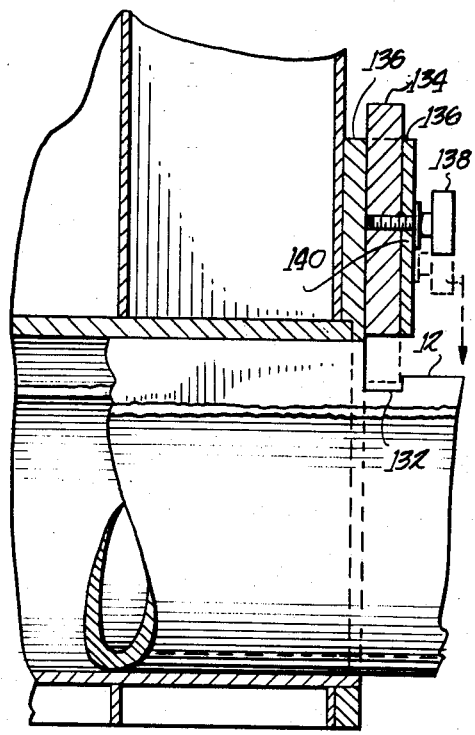
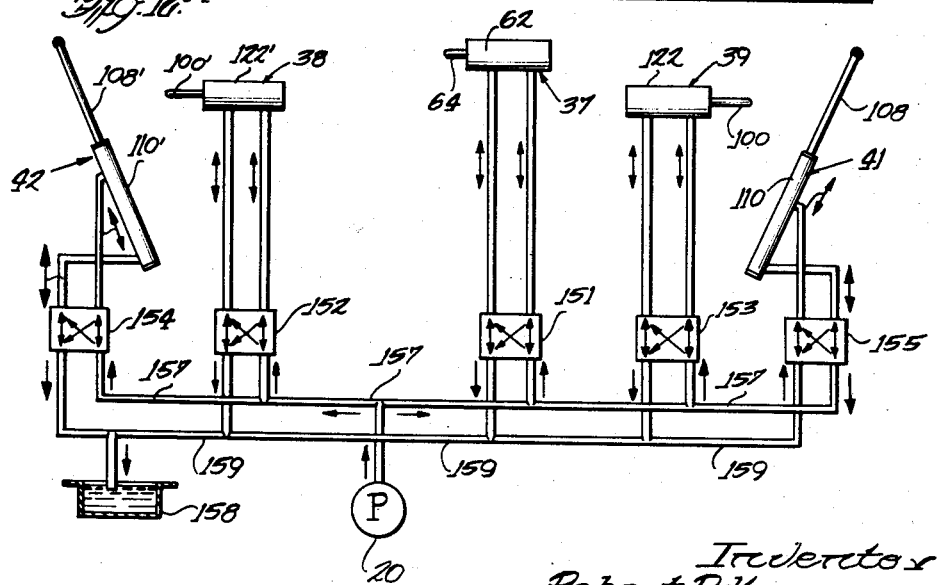
Inventor
Robert P. Kumferman
Dominik, Lazo + Wrth
Attorneys

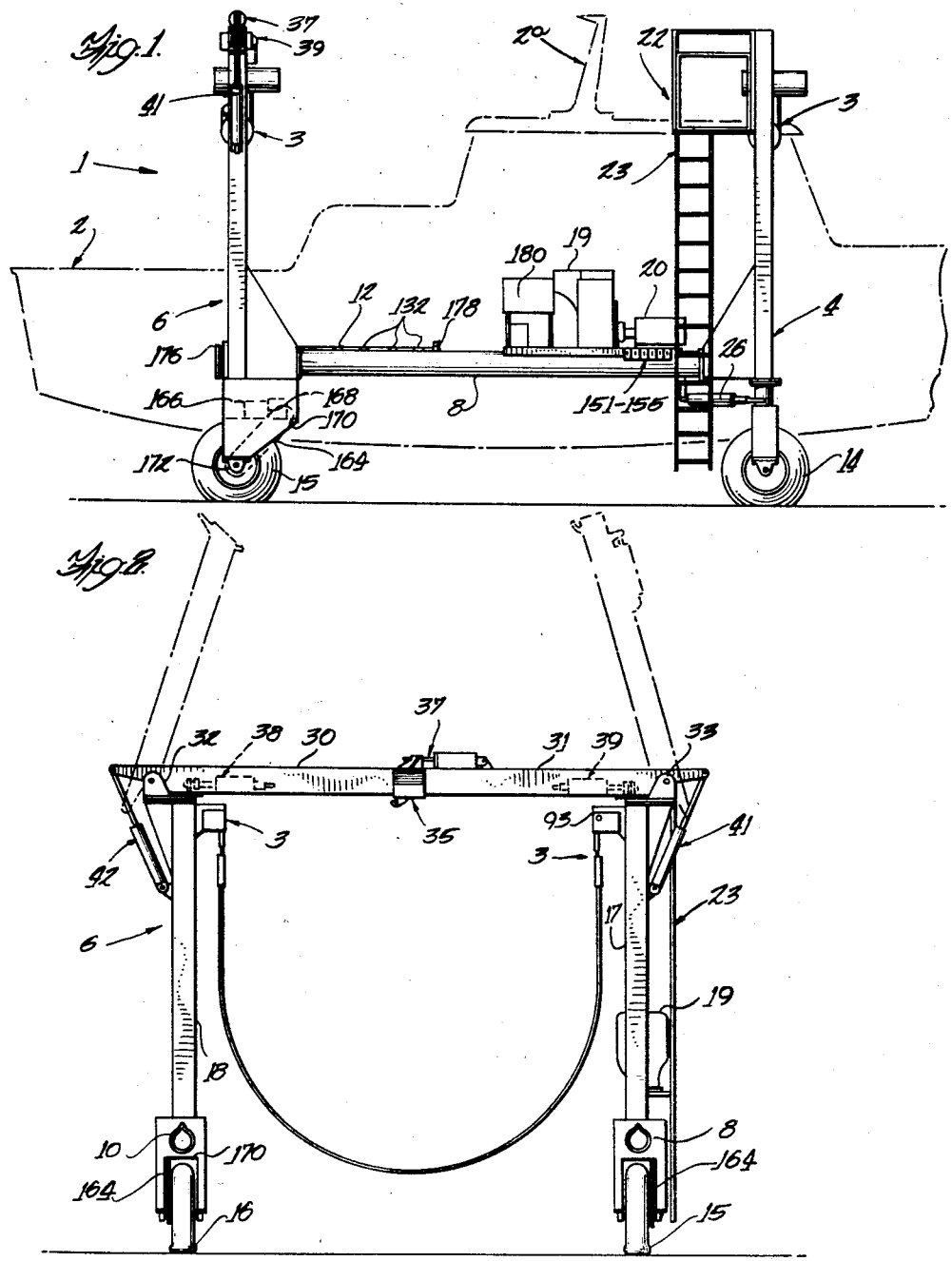

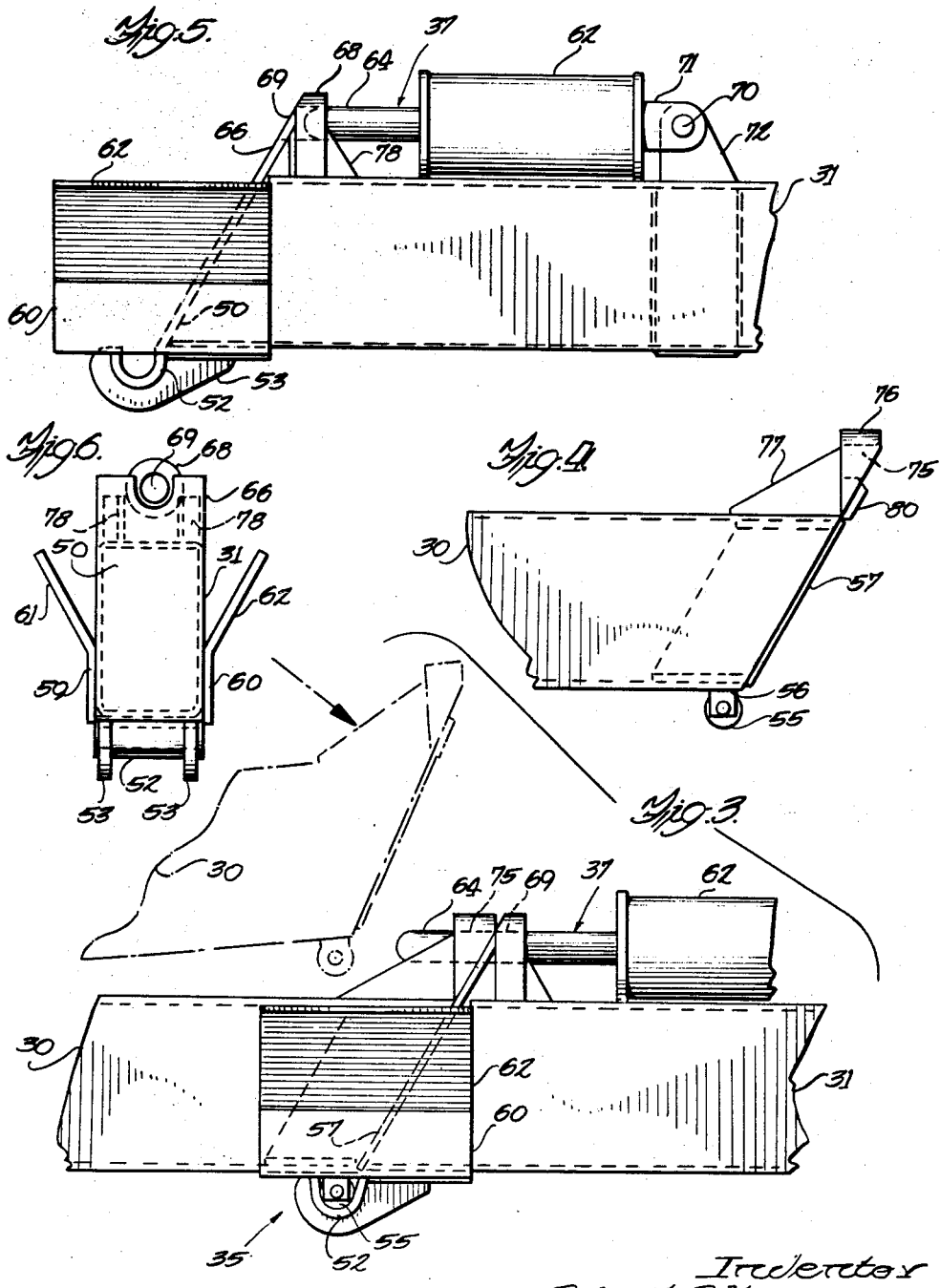

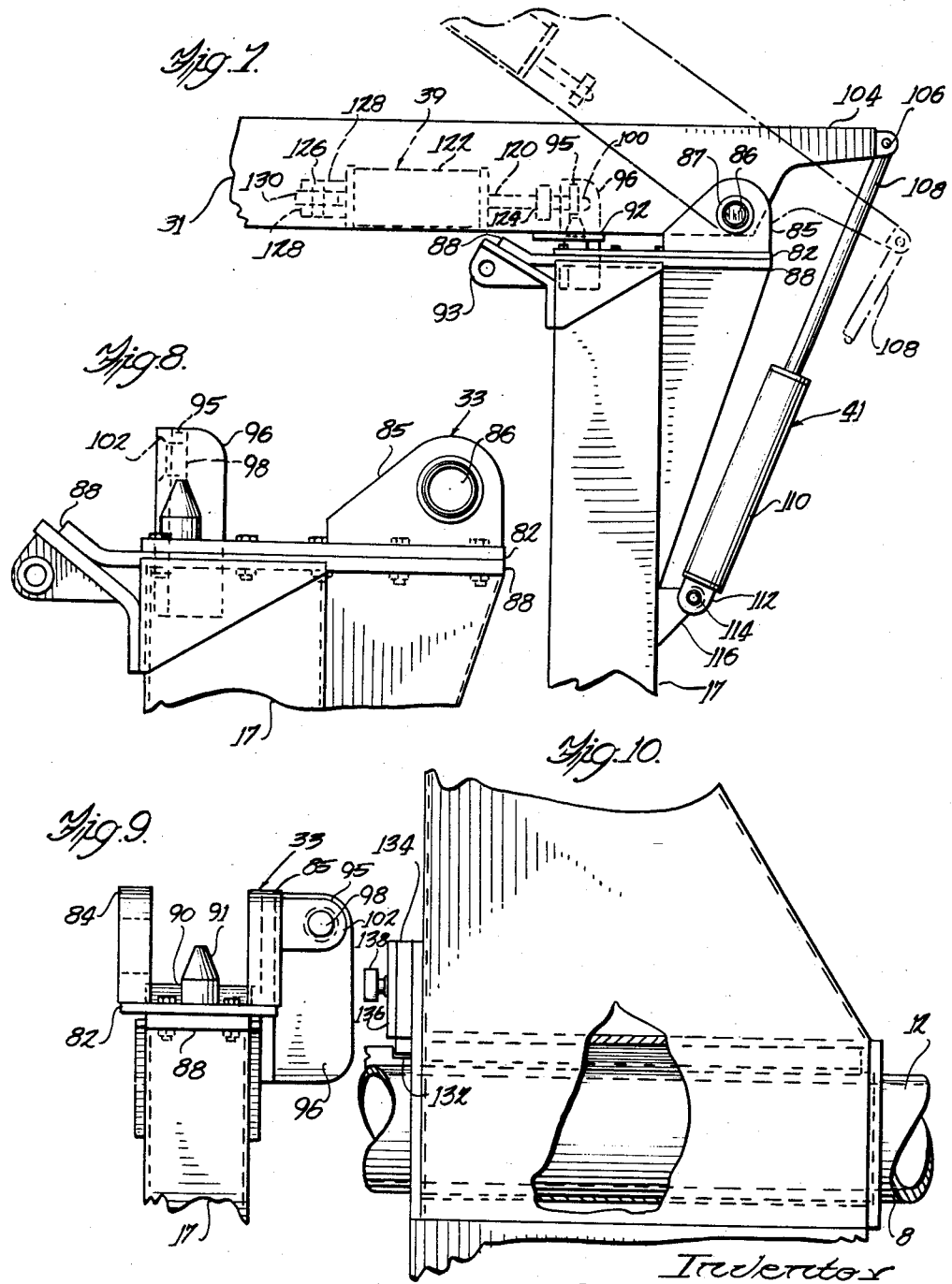

United States Patent Office 3,181,717
Patented May 4, 1965

3,181,717
OPENABLE REAR BEAM
Robert P. Kumferman, Menomonee Falls, Wis., assignor to Renner Manufacturing Company, Milwaukee, Wis.
Filed Oct. 16, 1961, Ser. No. 145,225
11 Claims. (Cl. 214—394)

The present invention relates generally to straddle trucks and more particularly relates to a construction thereof which permits the truck to straddle a load having a height dimension which would otherwise obstruct positioning the truck for loading and unloading operations. One of the more specific aspects of the invention relates to a straddle truck having a movable transverse frame member.

General features of straddle trucks are found in United States Patents 2,909,298 and 2,889,061 issued respectively to George J. Baudhuin and R. A. Stearn for "Self Propelled Mobile Lift" and "Rear Gate Boat Hoist." These general features include a frame having two vertical inverted U-shaped frame assemblies, extending transversely of the frame, which are maintained in spaced-apart relation by stringers running longitudinally of the vehicle. This construction provides a central region open fore and aft of the truck. The truck may thus be employed to carry loads longer than itself suspended between the legs of the inverted U-shaped assemblies.

Some loads have a height dimension which prevent positioning the truck for loading, for example, the mast of a sailboat.

The present invention has for an object a construction for allowing a straddle truck to approach and straddle a load having a height dimension which would ordinarily interfere with such approach and straddling.

A primary object of the invention is a straddle truck having a movable transverse portion of the frame. For convenience, the movable portion will be referred to as an openable beam.

The openable beam here contemplated comprises the base or horizontal portion of an inverted U-shaped assembly. By opening the beam the truck can be positioned so it straddles the load despite the height of the latter. The beam is then closed, the load hoisted, and the truck moves off. After the load is relocated and disconnected from the truck, the beam is opened and the truck moves from astride the load after which the beam is closed.

Very briefly, the preferred embodiment of the instant opening beam includes two cantilevers each of which pivots about the top of one of the inverted U legs. The free ends of the cantilevers meet in the central portion of the span and are joined by a locking means. One feature of the instant openable beam is a novel construction whereby the free ends of the cantilever portions of the beam interfit and mate with each other and are locked to each other when the beam is unopened.

Accordingly, one object of the invention is to provide, for a straddle truck, an openable beam that includes at least one cantilever mounted so its free end is pivotable out of engagement with means interfitting and mating with such cantilever.

A further object is provision of a means for interfitting and mating the several portions of an openable beam.

An object of the preferred embodiment is to provide for a straddle truck an openable beam having two pivotable cantilevers the free ends of which meet and connect together at a central region of the span covered by the beam.

The preferred embodiment of the invention further includes a construction selectively changing the length, or wheelbase, of the straddle truck whereby loads of different lengths are each supported in a fashion commensurate with their lengths.

FIG. 1 is a right-hand side elevation view of a straddle truck having an openable beam, broken lines representing a typical load.

FIG. 2 is a rear end elevation of a straddle truck having an openable beam, showing in broken lines the positions assumed by the cantilevers.

FIG. 3 is an enlargement of a portion of FIG. 2 which shows the manner in which the two cantilevers mate and lock together in the central portion of the openable beam, a broken line portion representing the left hand cantilever as it is approaching or leaving engagement with the other cantilever.

FIG. 4 illustrates the left hand cantilever of FIG. 3.

FIG. 5 illustrates the right hand cantilever of FIG. 3.

FIG. 6 is a side view of the right hand cantilever of FIG. 5, as viewed along the longitudinal axis of the cantilever.

FIG. 7 illustrates the means for pivoting a cantilever about the top of a column and related mechanism, and shows in broken lines the relationship of the parts during opening, all as viewed in FIG. 2.

FIG 8 is a detail of the column top of FIG. 7, with the cantilever removed.

FIG. 9 illustrates the detail of FIG. 8 as viewed along the removed cantilever.

FIG. 10 is an enlargement of a portion of FIG. 1 and represents the manner of slidably connecting to the stringers the inverted U-shaped frame member columns or legs.

FIG. 11 illustrates the construction of FIG. 10 as viewed from the left side of FIG. 10.

FIG. 12 is a cross section along 12—12 of FIG. 11.

FIG. 12A is a schematic diagram of a hydraulic system for opening and closing the openable beam.

Referring now to FIGS. 1 and 2, there is shown the general organization of a straddle truck 1 which is suitable for carrying a load 2 such as a sailboat having a mast 2a which is taller than the straddle truck. Suitable means such as hoists and their associated slings, generically denoted as 3, are provided for attachment to the load.

Front and rear vertical inverted U-shaped frame assemblies 4 and 6 are provided at opposed ends of the straddle truck. Right hand and left hand horizontal stringers 8 and 9 connect the inverted frame assemblies. The stringers are preferably welded or otherwise positively fixed to the front frame assembly but are slidably connected to the rear frame assembly 6 in the fashion shown in FIGS. 10 and 11. In the preferred embodiment each stringer has a key 12 fixedly secured thereto as part of its structure. The vertical legs or columns of the front frame assembly 4 each has a wheel 14 disposed therebeneath. Rear drive wheels 15, 16 are respectively disposed and supported from the bottom of the columns or legs 17, 18. The columns 17, 18 constitute a portion of the rear frame assembly 6.

The straddle truck is preferably self propelled by an engine 19, which may conveniently be an internal combustion engine preferably of the spark ignition type. A hydraulic pump 20 is driven by the motor. The operator or driver of the straddle truck can place himself on the operator's platform 22 to which access is had by the ladder 23.

A suitable type of steering means is employed in the self propelled straddle truck. One suitable steering system is of the character shown in my copending application Serial No. 136,940 entitled "Vehiclular Steering." The steering system operates by pivoting the front wheels 14 by means of the hydraulic steering cylinders 26. The above-mentioned copending application discloses an advantageous system for accomplishing this steering with a mechanism having bell cranks located at the corners of the front inverted U and connecting rods which connect the bell cranks with each other and with hydraulic valves for each of the steering cylinders 26, there being such a cylinder for each wheel 14. This construction involves alternating the connecting rod with the bell cranks, the whole being supported from the front frame assembly.

The general organization of the openable beam is illustrated in FIG. 2, with details thereof being shown in FIGS. 3–9. The openable beam assembly constitutes the rear inverted vertical U-shaped frame assembly 6 wherein the horizontal transverse member comprises cantilever beam portions 30, 31 which can be swung through respective vertical arcs to engage or disengage with each other. The respective column members 17, 18 have pivot means 32, 33 mounted adjacent their tops in order to support the cantilever means for swinging through their respective arcs.

The cantilever beams when swung into engagement with each other are connected at a central portion of the span by an interfitting means 35 which has mating portions on the free end of each cantilever beam which meet and interfit with the other such beams. A span locking means 37, which includes a hydraulic cylinder, is provided for selectively locking the two cantilever beam sections together. Each of the cantilever beams is locked to its corresponding column by a column locking means 38, 39 which is selectively operated and preferably includes a double acting hydraulic cylinder. A power means 41, 42 applies to each beam a force adequate to revolve the cantilever beam about its respective pivot means. Again, the power means preferably comprises a hydraulic cylinder assembly.

In operation, the operator unlocks the span lock means 37 and the column lock means 38, 39 and then raises the left hand column as seen in FIG. 2 by operating the hydraulic cylinder 42. Then the right hand cantilever is raised. When both of the cantilevers have been raised, they assume positions as indicated in the broken lines of FIG. 2. When it is desired to close the openable beam, the steps are carried out in reverse. It will be obvserved that the span and column locking means are positioned so that an operator standing near the front of the straddle truck can observe their operation, and thereby be assured that locking or unlocking, as the case may be, has taken place before proceeding with any further use of the truck.

Details of the span lock means 37 and the interfitting means are best observed from FIGS. 3–6 where it is seen that the box girder construction is employed for the cantilever beams. The right hand cantilever 31 has an end plate 50 welded at an oblique angle across the free end of the beam. A hook like member 52 is secured to the bottom of the plate 50, and may advantageously be a rolled extension of the bottom side of the end plate. A pair of spaced apart brackets 53 are welded to the bottom of the cantilever 31 to further support the hook like projection 52 at the bottom of the oblique plate.

The hook like member 52 is engaged by a roller 55 which is revolvably supported from the bottom of the cantilever 30 by a pair of roller brackets 56 which are welded to the left hand cantilever 30. The plate 57 is welded to the end of the cantilever 30 at an angle supplemental to the angle of plate 50 on the other cantilever. With the just-described construction of the free ends of the cantilever beams 30, 31, a locking action is produced at the center of the span when the two beams are brought into horizontal alignment as shown in FIG. 3. The roller 55 is received in the hook like member 52 in such fashion that downward deflection of the openable beam is opposed by the interfit and locking engagement between the hook like member and the roller.

Guide members in the form of the opposed wing plates 59, 60 are provided to guide the roller into the hook and also to provide for alignment longitudinally of the straddle truck. The wing plates also provide an anti-buckling action to oppose deflection of the beam forwardly or rearwardly of the straddle truck when the beams are interlocked as in FIG. 3. The wing plates 59, 60 each comprise a metal plate welded to the right hand cantilever 31 to provide a converging funnel-like pocket into which the mating end of the left hand cantilever moves. The flared or wing like portions of the guide members, denoted 69, 62, serve as a guide means to guide the free end of the other cantilever down to position where the roller 55 and the hook 52 engage responsive to the cantilevers being moved into the solid line position of FIGS. 2 and 3. The flaring or bending also increases the resistance to deflection of the guide members, when the deflection is longitudinal of the straddle truck. It will be observed that the guide members are welded along the sides of the cantilever 31 and are spaced apart enough to receive the end of the other cantilever beam, including the roller. The roller 55 and its corresponding brackets 56 are, of course, arranged so they can pass between the guide members without mechanical interference.

The span lock means 37 is a selectively operated member having a hydraulic cylinder assembly 62 that moves a bolt 64 through a pair of aligned holes and thereby keys together the two cantilevers and offers resistance to vertical deflection when the span locking means is locked, as shown in FIG. 3. The resistance to deflection or bending is of utmost importance in the described construction because the forces acting on the cantilever beams create a type of column action and the deflection resistance is needed to resist buckling. This is particularly true when the system is carrying a load 2.

The aligned holes 69, 75 referred to are advantageously provided in the fashion best shown in FIGS. 4 and 5. There, the plate 50 has an extension 66 which projects above the top of the cantilever 31. A bolt hole lug 68 is welded to the back of extension 66 and has formed therein a bolt hole 69 for receiving the bolt 64.

All of the hydraulic cylinders described herein are double acting, that is, pressurized hydraulic fluid is applied to drive them in either direction under power or to hold them in position, as the case may be. The cylinder 62 may be conveniently mounted in the fashion shown in FIG. 5 wherein the piston or ram on which bolt 64 is mounted is fully retracted and is inserted in the bolt hole in the unlocked position of FIG. 5. A pin 70 is then driven through the positioning lug 71 on the opposite end of the cylinder, thereby to connect it to the cylinder support bracket 72 which is welded to the cantilever 31.

The other cantilever beam 30 has a hole 75 through which the bolt extends (FIG. 3) and which is so located on the cantilever 30 that it can be moved into alignment with the hole 69. The bolt hole 75 is formed in a block 76 which is secured by any appropriate means such as welding to the cantilever 30. A bracket 77, similarly secured to the cantilever, aids in supporting the block 76. Similar brackets 78 are provided to support the lug 68 on the cantilever 31. The brackets 77, 78 are preferably arranged one on each side of the bolt hole in the adjoining lug or block, as shown in FIG. 6.

As shown in FIG. 4, the roller 55 extends slightly beyond the projection of the plane surface of the plate 57. In this fashion, the roller 55 is brought snugly into engagement with the hook while permitting the plate 57 to come into alignment with the corresponding plate 50.

It has been found advantageous to provide a spacer block 80 just below the hole 75 (FIG. 4). The spacer block 80 projects slightly beyond the plate 57 and engages the surface 66. The block 80 on occasion operates as a type of pivot point when stresses on the straddle truck are tending to buckle the openable beam and aids in driving the roller into engagement with its mating hook.

FIG. 7 illustrates in solid lines the manner in which the openable beam is locked to the leg 17. The right hand portion as viewed in FIG. 2 is shown as representative of both portions. Broken lines illustrate a position assumed by the cantilever beam 31 responsive to opening the beam with the power means 41. FIGS. 8 and 9 show additional details of the pivot means assembly 33 which pivotally supports the cantilever 31 to swing in a vertical arc.

In all of FIGS. 7–12, it is to be understood that the right hand portion, as seen in FIG. 2, is discussed as representative of the construction on both sides of the openable beam and that the left hand side in the preferred embodiment is constructed in like but mirror-image fashion.

Referring now to FIGS. 7–9, the pivot means assembly 33 includes a cap plate 82 to which is welded or otherwise secured a pair of spaced apart pin supports 84, 85 in which the cantilever pivot pin 86 is mounted in the supports, preferably revolvably mounted and secured against axial movement by snap rings 87 or other suitable means.

The right hand pivot means assembly 73 further includes a cantilever-to-leg aligning means in the form of the vertical pin 90 which has a frustro-conical portion 91 at its upper end to act as a fixed drift pin in coaction with the horizontal plate 92 which has a hole therein for receiving the pin 90.

The cap plate 82 also supports the column locking plate 95 which is preferably secured to a mounting block 96 so that the keyhole 98 is supported for alignment with a tapered bolt 100 that moves in and out of the hole to lock and unlock, respectively, as a cantilever to the leg. The hole 98 has a countersunk forward portion 102 whereby the tapered bolt 100 is guided into proper locking relation.

A cap plate 82 is secured by bolts or the like to a column top 88. A hanger 93 is secured to the upper end of the column 17 and to the under side of top 88. The hanger 93 is a means for suspending the hoist assemblies 3 from the column instead of, for example, from the openable beam.

The cantilever beam portion 31 has a crank arm 104 that extends past the pivot pin 86 to the outside of the inverted U-shaped structure 6, as viewed in FIGS. 2 and 7. A crank pin 106 revolvably connects the crank arm to the piston rod 108. The piston rod extends from a piston that is slidably mounted in the hydraulic cylinder 110. The rod 108 and the cylinder 110 comprise the power means 41. The cylinder has a pair of spaced apart mounting lugs 112 which are revolvably secured by a mounting pin 114 to a column support bracket 116. The power means 41, comprising the cylinder 110, the piston rod 108 and the associated hydraulic fittings as schematically outlined in FIG. 12A is a double acting hydraulic cylinder which opened the openable beam by retracting the piston rod 108 and rotating the cantilever beam about the pin 86. In the course of this rotation, which moves the cantilever through a vertical arc, the power means 41 rotates about its pins 106 and 114 to assume the appropriate position, as partially indicated in broken lines in FIG. 7.

The bolt 100 blocks the cantilever beam to the column by moving into the hole 98 in column lock plate 95. The bolt 100 comprises a tapered end, or a member having a tapered end, on the piston rod 120 of the column locking means. The piston rod extends from a piston which is reciprocatably mounted inside the hydraulic cylinder 122. The piston rod is slidably mounted in a rod support bracket 124 to slide back and forth therein in much the same fashion that bolt 64 slides back and forth in the lug 68 of FIG. 5. In the preferred embodiment, the bolt and piston rod 100, 102 do not withdraw completely out of the hole in which they are slidably supported in the support bracket 124, as with the similar assembly referred to for FIG. 5. A pin 126 secures the cylinder mounting lugs 128 to a support lug 130 which latter is secured as by welding to one side of the cantilever beam (FIG. 7). It is preferred that the column lock means 38, 39 be disposed where they may be viewed by the operator during operation of the vehicle or the opening beam, i.e., where they can be viewed from the platform 22 or the hydraulic pump 20 as shown in FIG. 1.

A positive locking means is provided to secure the respective right and left hand portions of the openable beam to the right and left hand stringers 8, 10 so that alignment of both sides may be visually observed by the operator when lengthening or shortening the straddle truck and also to maintain alignment once it is arrived at. FIGS. 10–12 disclose the important features of the locking means, which includes a plurality of notches 132 in each of the keys 12. The notches are arranged in pairs, each notch of each pair being laterally (of the truck) aligned with a corresponding notch in the key on the other stringer. The notches are sized to receive the vertically sliding latch plate 134 which is mounted in the guide member 136 to slide up and down to be engaged in and disengaged from the notches. The latch plate is secured in either the engaged or disengaged position by tightening the threaded wing bolt 138 to maintain the latch plate disengaged (FIG. 12 solid lines) or engaged in the notch (FIG. 12 broken lines). The wing bolt 138 is carried in a threaded hole centrally located in the latch plate and extends through a slot 140 in the central part of the guide 136. The end portions of the slot define the limits of the motion of the locking means.

FIGS. 10–12 also illustrate the cross section of the stringers 8, 10 as they appear with the key 12 attached thereto. Moreover, the shape of the bearing 142 in the base of the respective columns is shown to correspond to that of the keyed stringer cross section, as best seen in FIG. 11.

FIG. 12A illustrates schematically the hydraulic system for operating the openable beam. The hydraulic components such as the cylinders, piston rods, bolt members and the like have the same reference numerals as stated above, except that the left hand portions use primed numbers for their parts having a corresponding function. The hydraulic lines or conduits are of any suitable construction and may be all or partially of flexible hydraulic hose.

Hydraulic control valves 151, 152, 153, 154 and 155 direct hydraulic liquid from the pump 20 into the appropriate end of the double acting cylinders making up the various locking means and power means. Valves 151–155 are conveniently mounted on the base plate of the motor-pump assembly, or adjacent thereto (FIG. 1), thus permitting operation from a position remote from the openable beam and its locking and power means. Preferably, during operation to open the beam, the control valves are operated in the same sequence as their reference numbers. When closing the beam, the valves are operated in a reverse sequence. An alternate sequence of operation during the closing of the beam would include lowering the respective cantilever beam portions by operating control valves 155, 154 in sequence. Then, the span lock means 37 is operated by moving the same to a locked position using the control valve 151. The column locking means 38, 39 are then operated.

FIG. 12A shows a high pressure hydraulic fluid delivery line 157 to conduct fluid from the pump 20 to the respective ones of the control valves. An exhaust manifold generically denoted 159 conducts low pressure fluid from the opposite ends of the respective hydraulic cylinders, through the corresponding control valve, and then back to the exhaust reservoir 158. It will be observed that the respective hydraulic control valves 151–155 all provide means for directing high pressure fluid to either end of the cylinder in a selected fashion while simultaneously permitting the exhaust of fluid from the opposite ends of the respective cylinders, as symbolically indicated by the arrows. These components are commercially available control valves.

The driving means for the straddle truck is preferably arranged in the fashion shown in my copending application for "Vehicular Steering," filed September 8, 1961, Serial No. 136,940. This includes a power transmission chain 164 that is drivingly connected to a hydraulic motor 166 through an appropriate speed reduction transmission 168. The motor and transmission are supported on a platform 170 which is located between the forks of the bracket supporting the drive wheels 15, 16. An arrangement of this nature is provided for each rear drive wheel. The hydraulic motors are, of course, connected to receive high pressure hydraulic fluid from the pump 20. The drive chains 164 are respectively connected to an appropriate pinion 172 which is secured on the same axle with the rear drive wheel 15, or 16 as the case may be.

In review it will be seen that the rear beam of the above-disclosed embodiment is openable and that the longitudinal distance between the front and the rear frame assemblies 4, 6 may be selectively varied. Moreover, the openable beam involves a pair of cantilever beam portions 30, 31 each of which is revolvably secured on top of a corresponding leg member in such fashion as to be swung through a vertical arc in order to either open or close the beam. Means such as double acting hydraulic cylinders are provided to lock the cantilever beams in place, both at the center and ends of the span, and also to swing the same into and out of place during beam opening and closing operations. The nature of the hydraulic mechanisms permits opening the beam from a remote location such as the front of the vehicle, a station adjacent the hydraulic pump 20. The cantilever beams have a mating and interfitting means at their free ends whereby one becomes mechanically locked into the other responsive to moving both beams in sequence to the horizontal position represented by solid lines in FIG. 2. The mating and interfitting means includes the hook 52; roller 55; oblique surfaces presented by plates 50, 57; and the guide means 59–62.

During operation, the various locking means 37, 38 and 39 are unlocked and the left hand beam portion is swung through its vertical arc. The right hand is then swung vertically by manipulation of control valve 155.

The openable beam or inverted U-shaped frame assembly should be in the position shown in FIG. 2, i.e. with the beam closed, when adjusting the distance between the front and rear frame assemblies. This operation first involves disengaging the latch plate 134 (FIGS. 9-12) on each of the column bases from the notches 132 in which they happen to be situated. Each drive wheel 15, 16 has its individual motor 166 and individual drive means (FIG.1). Hydraulic fluid is then directed into the drive motors 166 and the rear frame assembly 6 either advances or retreats along the two stringers 8, 10. The hydraulic motors 166 are both of reversible nature whereby they can drive in either direction. When the rear frame assembly approaches the position desired, it is brought to a halt and the latch plate 134 is moved down into whichever one of the notches 132 is positioned for engagement. The wing bolt 138 is then tightened to complete the positive locking arrangement. On occasion, due to stresses in service and the like, or conditions of the ground beneath the drive wheels 15, 16 the two legs 17, 18 of the rear frame assembly may not advance in unison, as is ordinarily the case. In such instances, both of the hydraulic motors are stopped when each one of the legs 17, 18 is locked as the latch plate 134 on each leg comes into position adjacent the selected notch 132. The notches 132 are paired with each other so that they are laterally aligned, speaking with lateral reference to the straddle truck as a whole. Stops 176, 178 on the rear end of each stringer and at the front of the key 12, respectively, limit the extent of adjustment.

When the straddle truck is loaded (FIG. 1) the columns 17, 18 tend to pull together at their upper ends. The mating and interfitting means 35 and span lock means are thereby subjected to a column-type buckling action which their unique construction resists. Also, the columns, being keyed to stringers 8, 10 exert a torque thereon. The chiefly circular stringer cross section (FIG. 11) effectively resists the torque.

Preferably all of the bolts on the locking means have tapered ends as shown in FIGS. 3, 5 and 7 whereby they more easily align the holes which they engage. The holes, in turn, may be countersunk slightly where the tapered bolt end is received, as seen in FIG. 4.

The hoists 3 may be manually operated but preferably are each driven by an electric motor. The four hoist motors are in turn powered by a generator 180 (FIG. 1) driven by the motor 19.

It is to be understood that the invention is expressed in the means disclosed and that any of the theories discussed are presented in the interest of clarity and that the invention is not necessarily restricted to any one theory or the propriety thereof.

While the invention has been disclosed with respect to the specific embodiments and a particular sequence of operations, it is to be understood that various modifications, substitutions of equivalents, and other changes may be made by one skilled in the art within the compass of the objects, features, and advantages of the invention, and still be within the invention expressed in the following claims.

I claim:

1. A straddle truck having an openable horizontal rear beam that spans the distance between a pair of vertical columns and that includes a pair of vertically swingable cantilever beams each of which is rotatable about a horizontal pivot at the top of a respective one of the columns, the free ends of said cantilever beams meeting in a central portion of the span and having a construction for removably locking said cantilever beam free ends together that comprises
   a first oblique surface extending up from the bottom of the free end of one cantilever beam and back toward the pivoted end of said one cantilever beam;
   a second oblique surface extending down from the top of the free end of the other cantilever beam and back toward the pivoted end of said cantilever beam at an angle supplemental to said first surface;
   a roller revolvably supported on said other cantilever beam adjacent the bottom of said second oblique surface;
   a hook like member secured to the bottom of said first oblique surface with the open portion facing up, said hook like member extending toward said other cantilever beam and being positioned to receive said roller therein;
   a pair of flared guide members secured in opposed flanking relation to the sides of and extending past the oblique surface at the free end of either one of said cantilever beams;
   said guide members being convergent toward that portion of said either one of said cantilever beams which is furthest away from the column corresponding thereto and spaced apart for receiving the free end of the other one of said cantilever beams; and
   a locking means for selectively securing the free ends of both said cantilever beams against swinging vertically.

2. A straddle truck having an openable beam and apparatus for locking in accordance with claim 1 and further comprising
   another locking means on each of said beams operatively positioned to engage a corresponding member on each of said columns for selectively securing each of said cantilever beams to its respective column.

3. A straddle truck having an openable beam and apparatus for locking in accordance with claim 1 and further comprising
   means for selectively operating said locking means mounted on said straddle truck from a remote position.

4. A straddle truck having apparatus for locking in accordance with claim 1 wherein said locking means includes
an extension of each of said oblique surfaces having a locking pin hole alignable with the corresponding hole in the other of said oblique surfaces when both cantilever beams are horizontal;
a locking pin; and
means for selectively moving said locking pin in and out of at least one of said holes.

5. A straddle truck having an openable horizontal rear beam that spans the distance between a pair of vertical columns and that includes a pair of vertically swingable box-cross-section cantilever beams each of which pivots about a horizontal pivot on the top of a respective one of the columns, the free ends of said cantilever beams meeting in a central portion of the span and having a construction for removably locking said cantilever free ends together that comprises
a first oblique surface extending up from the bottom of the free end of one cantilever beam and back toward the pivoted end of said one cantilever beam;
a second oblique surface extending down from the top of the free end of the other cantilever beam and back toward the pivoted end of said cantilever beam at an angle supplemental to said first surface;
a roller revolvably supported on said other cantilever beam adjacent the botom of said second oblique surface;
a hook like member securably supported from said other cantilever beam at the bottom of said first oblique surface with the open portion facing up, said hook like member extending toward said other cantilever beam and being positioned to receive said roller therein;
a pair of opposed flared guide members secured in respective opposed flanking relation to the sides of and extending past the oblique surface at the free end of said other cantilever beam;
said guide members being convergent toward said hook like member; and
a locking means for selectively securing the free ends of both said cantilever beams against swinging vertically.

6. A straddle truck construction allowing opening of the transverse beam adjacent one end of the truck and allowing adjustment of the longitudinal distance between said beam and another transverse beam adjacent the other end of the truck, comprising the combination of
a pair of horizontal parallel srtingers extending longitudinally of the truck;
a key secured to, and extending longitudinally of, each of said stringers and having a plurality of notches therein;
a pair of columns, each having adjacent its lower end a bearing shaped to slidably receive one of said stringers, each said bearing extending longitudinally of said truck;
each of said stringers being slidably received in one of said bearings; plate means on each of said columns for selectively engaging one of said notches on said key to prevent longitudinal movement of said column with respect to said stringers;
and an openable horizontal transverse beam having first and second interlockable portions, at least one of such portions being revolvably supported atop a respective one of said columns.

7. A straddle truck construction in accordance with claim 6 further comprising
a wheel supported underneath each of said columns to drive in a direction parallel to said stringers; and
means for revolvably driving each said wheel whereby said columns are moved longitudinally of said stringers responsive to driving said wheels when said stringers are prevented from moving in unison with said columns.

8. A straddle truck construction allowing opening of the transverse beam adjacent one end of the truck and allowing adjustment of the longitudinal distance between said beam and another transverse beam adjacent the other end of the truck, comprising the combination of
a pair of horizontal parallel stringers extending longitudinally of the truck;
a notched key secured to and extending longitudinally of each of said stringers;
a pair of columns, each having adjacent its lower end a bearing shaped to slidably receive one of said stringers with said key thereon; each said bearing extending longitudinally of said truck;
means on one column for selectively engaging each of said notches in each of said keys to prevent relative movement between each said column and each said stringer;
and an openable horizontal transverse beam having first and second interlockable portions, at least one of such portions being revolvably supported atop a respective one of said columns.

9. A straddle truck construction having an openable horizontal beam that spans the distance between a pair of vertical columns at one end thereof, comprising
an openable beam having first and second cantilever beam portions each pivotally connected to the vertical columns for vertical motion in a common vertical plane, so that they connect with each other midway between said vertical columns, when they lie in a common horizontal plane,
interengaging means secured to the free end of each cantilever beam portion,
hydraulic motor means connected between the straddle truck and the supported end of each cantilever beam to swing the free end of each cantilever beam in a vertical arc into and out of engagement with said interengaging means, and
lock means for selectively locking said first and second cantilever beam portions together when said interengaging means are engaged thereby to form a solid beam extending across said span.

10. An openable beam construction for a straddle truck in accordance with claim 9 further comprising
an extension of each of said beam portions extending outwardly of said pivotal connection, and said motor means including
a reversible motor means for applying force to each said extension to swing each beam portion into and out of engagement.

11. An openable beam construction for a straddle truck in accordance with claim 10 wherein said lock means includes a hydraulically actuated motor assembly for locking the two beams together, said openable beam further including
hydraulically actuated lock means for locking each beam to its respective vertical column when the beams are in the horizontal position to provide a rigid beam structure.

References Cited by the Examiner

UNITED STATES PATENTS

| | | | |
|---|---|---|---|
| 1,013,231 | 1/12 | Stearns | 248—423 X |
| 1,757,798 | 5/30 | Grab | 214—392 |
| 2,708,346 | 5/55 | Smith | 114—05 X |
| 2,822,100 | 2/58 | Pesta | 214—396 |
| 2,834,401 | 5/58 | Tanner | 248—423 |
| 2,889,061 | 6/59 | Stearn | 214—394 |
| 2,905,345 | 9/59 | Schramm | 214—505 |
| 3,075,603 | 1/63 | Baudhuin | 214—394 X |

HUGO O. SCHULZ, *Primary Examiner.*

GERALD M. FORLENZA, *Examiner.*